United States Patent
El-Moussa et al.

(10) Patent No.: US 11,586,733 B2
(45) Date of Patent: Feb. 21, 2023

(54) MALWARE DETECTION (71) Applicant: British Telecommunications Public Limited Company, London (GB)

(72) Inventors: Fadi El-Moussa, London (GB); Behnan Azvine, London (GB)

(73) Assignee: British Telecommunications Public Limited Company, London (GB)

( * ) Notice: Subject to any disclaimer, the term of this patent is extended or adjusted under 35 U.S.C. 154(b) by 870 days.

(21) Appl. No.: 15/541,089

(22) PCT Filed: Dec. 17, 2015

(86) PCT No.: PCT/EP2015/080246
§ 371 (c)(1),
(2) Date: Jun. 30, 2017

(87) PCT Pub. No.: WO2016/107754
PCT Pub. Date: Jul. 7, 2016

(65) Prior Publication Data
US 2017/0351860 A1    Dec. 7, 2017

(30) Foreign Application Priority Data
Dec. 30, 2014   (EP) .................................... 14250124

(51) Int. Cl.
*H04L 9/00* (2022.01)
*G06F 21/56* (2013.01)
*G06F 21/55* (2013.01)

(52) U.S. Cl.
CPC ............ *G06F 21/566* (2013.01); *G06F 21/56* (2013.01); *G06F 21/552* (2013.01); *G06F 2221/033* (2013.01)

(58) Field of Classification Search
USPC .......................................................... 726/23
See application file for complete search history.

(56) References Cited

U.S. PATENT DOCUMENTS 8,095,964 B1 *   1/2012   Zhong ................. H04L 63/1416
                                                                      726/4
8,321,943 B1 *  11/2012   Walters ................. G06F 21/552
                                                                     726/22
(Continued)

FOREIGN PATENT DOCUMENTS

EP    2 741 227 A1    6/2014
EP    2 750 070 A2    7/2014
(Continued)

OTHER PUBLICATIONS

International Search Report for corresponding International Application No. PCT/EP2015/080246 dated Mar. 14, 2016; 4 pages.
(Continued)

*Primary Examiner* — Christopher J Brown
(74) *Attorney, Agent, or Firm* — Patterson Thuente, P.A.

(57) ABSTRACT

A malware detection system to detect malware in a client computer system includes a behavior profile generator adapted to generate a behavior profile specifying operational behaviors of a computer system indicative of the existence of malware in the computer system; an interface adapted to communicate the behavior profile to the client; and an identifier responsive to a message from the client that the behavior profile is exhibited by the client and adapted to identify a reaction instruction for performance by the client, wherein the interface is further adapted to communicate the reaction instruction to the client.

14 Claims, 2 Drawing Sheets

(56) References Cited

U.S. PATENT DOCUMENTS

| | | | | |
|---|---|---|---|---|
| 8,407,471 | B1* | 3/2013 | Sobel | H04L 61/4511 713/168 |
| 8,413,235 | B1* | 4/2013 | Chen | G06F 21/552 713/188 |
| 8,713,631 | B1 | 4/2014 | Pavlyushchik | |
| 8,776,168 | B1* | 7/2014 | Gibson | H04L 63/102 709/225 |
| 8,806,638 | B1* | 8/2014 | Mani | H04L 63/0227 726/24 |
| 8,813,234 | B1 | 8/2014 | Bowers et al. | |
| 8,898,788 | B1 | 11/2014 | Aziz et al. | |
| 8,910,238 | B2* | 12/2014 | Lukacs | G06F 21/53 713/164 |
| 9,332,029 | B1* | 5/2016 | Tikhonov | G06F 21/566 |
| 9,535,727 | B1 | 1/2017 | Jerbi et al. | |
| 9,671,816 | B2* | 6/2017 | Berry | G06F 1/3206 |
| 2004/0158741 | A1 | 8/2004 | Schneider | |
| 2004/0230834 | A1 | 11/2004 | McCallam | |
| 2005/0108562 | A1 | 5/2005 | Khazan et al. | |
| 2007/0016953 | A1 | 1/2007 | Morris et al. | |
| 2007/0089111 | A1 | 4/2007 | Robinson et al. | |
| 2007/0240222 | A1 | 10/2007 | Tuvell et al. | |
| 2008/0320594 | A1 | 12/2008 | Jiang | |
| 2009/0044024 | A1 | 2/2009 | Oberheide et al. | |
| 2009/0055693 | A1 | 2/2009 | Budko et al. | |
| 2010/0175108 | A1 | 7/2010 | Protas | |
| 2011/0004935 | A1 | 1/2011 | Moffie et al. | |
| 2011/0023118 | A1 | 1/2011 | Wright | |
| 2011/0167491 | A1 | 7/2011 | Ruggerio | |
| 2012/0233694 | A1* | 9/2012 | Baliga | H04W 12/12 726/23 |
| 2014/0173740 | A1 | 6/2014 | Albanese et al. | |
| 2015/0101055 | A1* | 4/2015 | Tang | G06F 21/562 726/24 |
| 2015/0172321 | A1* | 6/2015 | Kirti | H04L 63/1425 726/1 |
| 2016/0021122 | A1 | 1/2016 | Pevny | |
| 2017/0323113 | A1 | 11/2017 | El-Moussa et al. | |
| 2017/0351861 | A1 | 12/2017 | El-Moussa et al. | |
| 2018/0053002 | A1 | 2/2018 | El-Moussa et al. | |
| 2018/0054451 | A1 | 2/2018 | El-Moussa et al. | |
| 2018/0060575 | A1 | 3/2018 | El-Moussa et al. | |
| 2018/0060581 | A1 | 3/2018 | El-Moussa et al. | |
| 2018/0060582 | A1 | 3/2018 | El-Moussa et al. | |
| 2018/0091531 | A1 | 3/2018 | El-Moussa et al. | |

FOREIGN PATENT DOCUMENTS

| | | | |
|---|---|---|---|
| EP | 2 816 469 A1 | 12/2014 | |
| WO | WO 2009/097610 A1 | 8/2009 | |
| WO | WO 2012/087685 A1 | 6/2012 | |
| WO | WO-2012087685 A1 * | 6/2012 | G06F 21/566 |
| WO | WO-2013172750 A1 | 11/2013 | |
| WO | WO-2015/128612 A1 | 9/2015 | |
| WO | WO-2015/179020 A2 | 11/2015 | |
| WO | WO-2016/034496 A1 | 3/2016 | |
| WO | WO-2017/021153 A1 | 2/2017 | |
| WO | WO-2017/021154 A1 | 2/2017 | |
| WO | WO-2017021155 A1 | 2/2017 | |
| WO | WO 2017/109128 A1 | 6/2017 | |
| WO | WO 2017/109129 A1 | 6/2017 | |
| WO | WO 2017/167544 A1 | 10/2017 | |
| WO | WO 2017/167545 A1 | 10/2017 | |
| WO | WO 2018/033350 A1 | 2/2018 | |
| WO | WO 2018/033375 A3 | 2/2018 | |

OTHER PUBLICATIONS

Written Opinion of the International Searching Authority for corresponding International Application No. PCT/EP2015/080246 dated Mar. 14, 2016; 6 pages.
U.S. Appl. No. 15/541,128, filed Jun. 30, 2016.
International Search Report and Written Opinion for PCT Application No. PCT/EP2015/080244 dated Mar. 24, 2016; 9 pages.
Open Virtualization Format Specification; Distributed Management Task Force, Inc.; Document No. DSP0243; Jan. 12, 2010; 42 pages; Version: 1.1.0.
International Search Report and Written Opinion for PCT Application No. PCT/EP2016/082476 dated Feb. 9, 2017; 3 pages.
International Search Report and Written Opinion for PCT Application No. PCT/EP2016/082477 dated Feb. 22, 2017; 3 pages.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.
Anonymous, "Can BitCoin be a better DRM? BitcoinBeginners," retrieved from https://www.reddit.com/r/BitcoinBeginners/commentsll y5yh8/can bitcoinbe_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Application as filed for U.S. Appl. No. 16/065,637, filed Jun. 22, 2018, Inventor(s): El-Moussa et al.
Application and Filing Receipt for U.S. Appl. No. 16/065,665, filed Jun. 3, 2016, Inventor(s): El-Moussa et al.
Application as filed for U.S. Appl. No. 16/086,142, filed Sep. 18, 2018, Inventor(s): El-Moussa et al.
Application as filed for U.S. Appl. No. 16/086,230, filed Sep. 18, 2018, Inventor(s): El-Moussa et al.
Application and Filing Receipt for U.S. Appl. No. 15/677,363, filed Aug. 15, 2017, Inventor(s): El-Moussa et al.
Application and Filing Receipt for U.S. Appl. No. 15/677,288, filed Aug. 15, 2017, Inventor(s): El-Moussa et al.
Application and Filing Receipt for U.S. Appl. No. 15/677,298, filed Aug. 15, 2017, Inventor(s): El-Moussa et al.
Application and Filing Receipt for U.S. Appl. No. 15/677,312, filed Aug. 15, 2017, Inventor(s): El-Moussa et al.
Application and Filing Receipt for U.S. Appl. No. 15/677,322, filed Aug. 15, 2017, Inventor(s): El-Moussa et al.
Application and Filing Receipt for U.S. Appl. No. 15/677,336, filed Aug. 15, 2017, Inventor(s): El-Moussa et al.
Assia Y., et al., "Colored Coins Whitepaper," 2015, available at docs.google.com/document/d/1AnkPcVZTCMLizw4DvsW6M8Q2JC0llzrTLuoWu2zlBE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28,

(56) References Cited

OTHER PUBLICATIONS 2018, from https://arx.iv.org/pdf/1505.02142.pdf, Kirchhoff-Institute for Physics, May 2015, 9 pages.

Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.

Bonneau J., et al., "Research Perspectives and Challenges for Bitcoin and Cryptocurrencies," International Association for Cryptologic Research, Mar. 19, 2015, 18 pages.

Chaisiri, "Optimization of Resource Provisioning Cost in Cloud Computing," IEEE Transactions on Services Computing, Apr.-Jun. 2012, vol. 5 (2), 14 pages.

Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.

Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.

Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.

CVE Details The Ultimate Security Vulnerability Datasouce, "Current CVSS Score Distribution for All Vulnerabilities" retrieved from https://www.cvedetails.com/ on Jun. 28, 2018, 1 page.

Czepluch J.S., et al., "The Use of Block Chain Technology in Different Application Domains," XP055242451, retrieved from http://http://www.lollike.org/bachelor.pdf, May 20, 2015, 109 pages.

Dr Gavin Wood, "Ethereum: A Secure Decentralize Generalized Transaction Ledger," EIP-150 Revision, Retrieved from http://gavwood.com//paper.pdf, Jun. 4, 2014, 32 pages.

Extended European Search Report for Application No. EP15179440.1, dated Feb. 10, 2016, 6 pages.

First.org, Inc., "Common Vulnerability Scoring System, V3 Development Update," available at www.first.org/cvss, CVSS v3.0 User Guide (v1.5), Jun. 2015; 15 pages.

Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.

Frigault M., "Measuring Network Security Using Bayesian Network-Based Attack Graphs," The Concordia Institute of Information systems Engineering, Mar. 2010, 88 pages.

Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.

Hawkins, et al., in "On Intelligence, How a New Understanding of the Brain Will Lead to the Creation of Truly Intelligent Machines," Times Books, ISBN 0-8050-7 456-2, 2004, Jul. 14, 2005; 174 pages.

Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.

International Preliminary Report on Patentability for Application No. PCT/EP2017/055081, dated Oct. 11, 2018, 9 pages.

International Preliminary Report on Patentability for Application No. PCT/EP2017/055082, dated Oct. 11, 2018, 8 pages.

International Preliminary Report on Patentability for Application No. PCT/EP2017/055090, dated Oct. 11, 2018, 10 pages.

International Preliminary Report on Patentability for Application No. PCT/EP2017/055091, dated Oct. 11, 2018, 9 pages.

Wang Z., "The Applications of Deep Learning on Traffic Identification," 2015.

Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.

International Search Report and Written Opinion for Application No. PCT/EP2016/067309, dated Nov. 3, 2016, 9 pages.

International Search Report and Written Opinion for Application No. PCT/EP2016/067310, dated Sep. 22, 2016, 9 pages.

International Search Report and Written Opinion for Application No. PCT/EP2017/055081, dated Apr. 7, 2017, 11 pages.

International Search Report and Written Opinion for Application No. PCT/EP2017/055082, dated Apr. 26, 2017, 9 pages.

International Search Report and Written Opinion for Application No. PCT/EP2017/055090, dated Jun. 14, 2017, 12 pages.

International Search Report and Written Opinion for Application No. PCT/EP2017/055091, dated Apr. 11, 2017, 11 pages.

International Search Report and Written Opinion for Application No. PCT/EP2017/055095, dated Apr. 11, 2017, 10 pages.

International Preliminary Report on Patentability for Application No. PCT/EP2017/055095, dated Oct. 11, 2018, 8 pages.

Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.

Adler M., "Threat Intelligence Visibility—the way forward," BT, 2015, available from www.globalservices.bt.com/uk/en/products/assure threat_monitoring.

Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.

Munoz-Gonzalez, "Exact Inference Techniques for the Dynamic Analysis of Bayesian Attack Graphs," Imperial college, London, Oct. 2015, 14 pages.

Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.

Numenta, "Hierarchical Temporal Memory including HTM Cortical Learning Algorithms," Version 0.2.1, Numenta, Sep. 12, 2011, 68 pages.

Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.

Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/O1shausenField1997.pdf, Dec. 24, 1996, 15 pages.

Plohmann D., et al., "Case study of the Miner Botnet", Cyber Conflict (CyCon), 2012 4th International Conference on Jun. 5, 2012, pp. 1-16.

International Search Report and Written Opinion for PCT Application No. PCT/EP2016/067308, dated Sep. 21, 2016, 8 pages.

Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.

Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.

Rosenfeld M., "Overview of Colored Coins," https:1/bravenewcoin.com/assets/Whitepapers/Overview-of-Colored-Coins.pdf, Dec. 4, 2012, 13 pages.

(56) References Cited

OTHER PUBLICATIONS

Skybox Security; Cybersecurity Management & Analytics retrieved from https://www.skyboxsecurity.com/ on Jul. 12, 2018, 7 pages.

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.

OPNET Technologies Network Simulator I Riverbed, retrieved from https://www.riverbed.com/products/steel central/opnet.html?redirect=opnet on Jun. 28, 2018, 5 pages.

International Preliminary Report on Patentability for Application No. PCT/EP2015/080244, dated Jul. 13, 2017, 8 pages.

International Preliminary Report on Patentability for Application No. PCT/EP2015/080246, dated Jul. 13, 2017, 8 pages.

International Preliminary Report on Patentability for Application No. PCT/EP2016/067308, dated Feb. 15, 2018, 7 pages.

International Preliminary Report on Patentability for Application No. PCT/EP2016/067309, dated Feb. 15, 2018, 7 pages.

International Preliminary Report on Patentability for Application No. PCT/EP2016/067310, dated Feb. 15, 2018, 8 pages.

Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.

International Preliminary Report on Patentability for Application No. PCT/EP2017/055094, dated Oct. 11, 2018, 8 pages.

International Search Report and Written Opinion for Application No. PCT/EP2017/055094, dated May 15, 2017, 10 pages.

Tschorsch F., et al., "Bitcoin and Beyond: A Technical Survey on Decentralized Digital Currencies," International Association for Cryptologic Research, May 15, 2015, pp. 1-37.

Application as filed for U.S. Appl. No. 16/319,391, filed Jan. 21, 2019, Inventor(s): El-Moussa et al.

Application as filed for U.S. Appl. No. 16/323,084, filed Feb. 4, 2019, Inventor(s): El-Moussa et al.

International Search Report and Written Opinion for corresponding PCT Application No. PCT/EP2017/069272 dated Feb. 20, 2018; 13 pages.

International Search Report and Written Opinion for corresponding PCT Application No. PCT/EP2017/068738 dated Oct. 9, 2017; 13 pages.

Fischer, et al.; "Training Restricted Boltzmann Machines: An Introduction", vol. 47, No. 1, Jun. 7, 2013, 27 pages.

\* cited by examiner

MALWARE DETECTION

CROSS-REFERENCE TO RELATED APPLICATIONS

The present application is a National Phase entry of PCT Application No. PCT/EP2015/080246, filed on 17 Dec. 2015, which claims priority to EP Patent Application No. 14250124.6, filed on 30 Dec. 2014, which are hereby fully incorporated herein by reference.

TECHNICAL FIELD

The present disclosure relates to the detection of malware and, in particular, the centralized detection of malware.

BACKGROUND

A challenge when using network connected computer systems is the potential for infection with malicious software, or malware, including, inter alia: viruses; worms; viruses; Trojan horses; rootkits; grayware; unsolicited software; privacy-invasive software; spyware; adware; fraudulent dialers; and even joke programs. Such malware can be communicated via a network to a network connected computer system and can be difficult to identify and remove. Malware detection and removal techniques improve all the time, though the nature and behavior of malware software evolves to match the progress made in anti-malware technology. Accordingly, the execution of malware detection and removal tools on computer systems can be a resource-intensive task.

Computer systems with spare resource capacity—such as desktop or laptop personal computers and the like—may be able to undertake routine or reactive malware detection and/or removal tasks at normal runtime with little or no impact on the performance of the computer system. Such systems generally employ powerful processors, often multiprocessors, with considerable spare memory and storage capacity.

Some computer systems are resource constrained such that the execution of malware detection and/or removal tasks at normal runtime can be expected to cause a noticeable and unacceptable reduction in the performance of the system. For example, such reduction in performance can be so considerable that the system becomes temporarily unusable or considerably less responsive. The execution of routine malware detection tasks can interfere with the normal services, facilities or functions of such computer systems and, in some cases, such interference can be so considerable that a user of the computer system is effectively denied access to, or the service of, the computer system while the malware detection and/or removal process is undertaken. In particular, even a modest reduction in performance (such as a 30-40% reduction in processor capacity) arising as a result of execution of an anti-malware process can render such systems much less useable. Examples of such resource constrained network connected computer systems include, inter alia: mobile computer systems such as mobile telephone handsets; smartphones; tablet computers; smart watches; thin-client laptop computer systems such as netbooks and Chromebooks; cloud computing terminal devices; so-called 'dumb' terminals; mobile terminals used in various industries such as logistics handsets and utilities handsets; barcode scanners; printers; RFID scanners; entertainment devices including televisions, set-top boxes, games consoles, handheld games consoles, music or sound players and handheld controllers; alarm systems; industrial controllers and controlling devices; manufacturing robots; vehicular computers such as in-car computer systems, satellite navigation systems, self-driving vehicle computers; and the like.

To address the challenge of providing anti-malware services with such resource constrained network connected devices it is known to centralize anti-malware services at a network connected server computer system such that client computer systems communicate with the server which provides remote anti-malware services such as file and memory scanning and malware removal. For example, a resource constrained client device can send files to a server computer system for the server to undertake a malware scan of the files. Where the server computer system identifies malware in a file the server can flag or remediate the malware, such as by removing all or part of the file. Further, such approaches to anti-malware are applicable to all client computer systems, not just resource constrained clients, and are increasingly offered as a security service such as a cloud service.

While the use of a centralized server anti-malware service reduces the demands placed on client computer systems, the sheer volume of network connected clients and files/data for scanning and/or remediation places considerable burdens on the centralized server. Additionally, and perhaps more noticeably, the constant shifting of files and data between client devices and the central server places unacceptable burdens on data networks.

Accordingly it would be beneficial to provide anti-malware for client devices without the aforementioned disadvantages.

SUMMARY

The present disclosure accordingly provides, in a first aspect, a computer implemented malware detection method to detect malware in a client computer system, the method comprising: generating a behavior profile specifying operational behaviors of a computer system indicative of the existence of malware in the computer system; communicating the behavior profile to the client; and in response to a message from the client that the behavior profile is exhibited by the client, identifying a reaction instruction for performance by the client and communicating the reaction instruction to the client.

In one embodiment, the profile specifies one or more actions performed by a computer system.

In one embodiment, the reaction instruction instructs the client to cease execution of one or more software components at the client.

In one embodiment, the reaction instruction instructs the client to block one or more features or services of the client.

In one embodiment, the reaction instruction instructs the client to undertake a malware scan.

In one embodiment, the reaction instruction instructs the client to transmit at least a portion of content stored in a memory of the client, the method further comprising: receiving the at least a portion of content; and performing a malware scan on the received content.

In one embodiment, the profile is defined based on an analysis of one or more known malware software components such that the profile is suitable for identifying behavior consistent with the known malware.

In one embodiment, the client is a resource constrained computer system such that executing a malware scan on the client can be expected to cause a reduction in performance of the client that denies at least some of the services, facilities or functions of the client to a user of the client for at least a portion of the duration of the malware scan.

In one embodiment, the behavioral operations are taken from a list including: network operations; process execution; data storage operations; the undertaking of telephony calls; the undertaking of messaging communications; service blocking; use of a camera associated with the client; and use of a microphone associated with the client.

The present disclosure accordingly provides, in a second aspect, a malware detection system to detect malware in a client computer system comprising: a behavior profile generator adapted to generate a behavior profile specifying operational behaviors of a computer system indicative of the existence of malware in the computer system; an interface adapted to communicate the behavior profile to the client; and an identifier responsive to a message from the client that the behavior profile is exhibited by the client and adapted to identify a reaction instruction for performance by the client, wherein the interface is further adapted to communicate the reaction instruction to the client.

The present disclosure accordingly provides, in a third aspect, a malware detection system to detect malware in a client computer system, the malware detection system comprising a processor and a data store wherein the processor is adapted to undertake the following: generating a behavior profile specifying operational behaviors of a computer system indicative of the existence of malware in the computer system; communicating the behavior profile to the client; and in response to a message from the client that the behavior profile is exhibited by the client, identifying a reaction instruction for performance by the client and communicating the reaction instruction to the client.

The present disclosure accordingly provides, in a fourth aspect, a computer program element comprising computer program code to, when loaded into a computer system and executed thereon, cause the computer to perform the steps of the method set out above.

BRIEF DESCRIPTION OF THE DRAWINGS

An embodiment of the present disclosure will now be described, by way of example only, with reference to the accompanying drawings, in which.

DETAILED DESCRIPTION OF EMBODIMENTS

Figure 1:
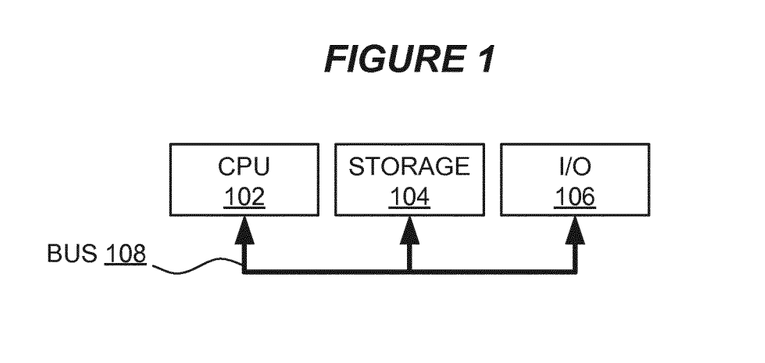
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

References to steps of operation of exemplary embodiments of the invention are enclosed in parentheses and depicted in broken circles in the figures.

Figure 2:
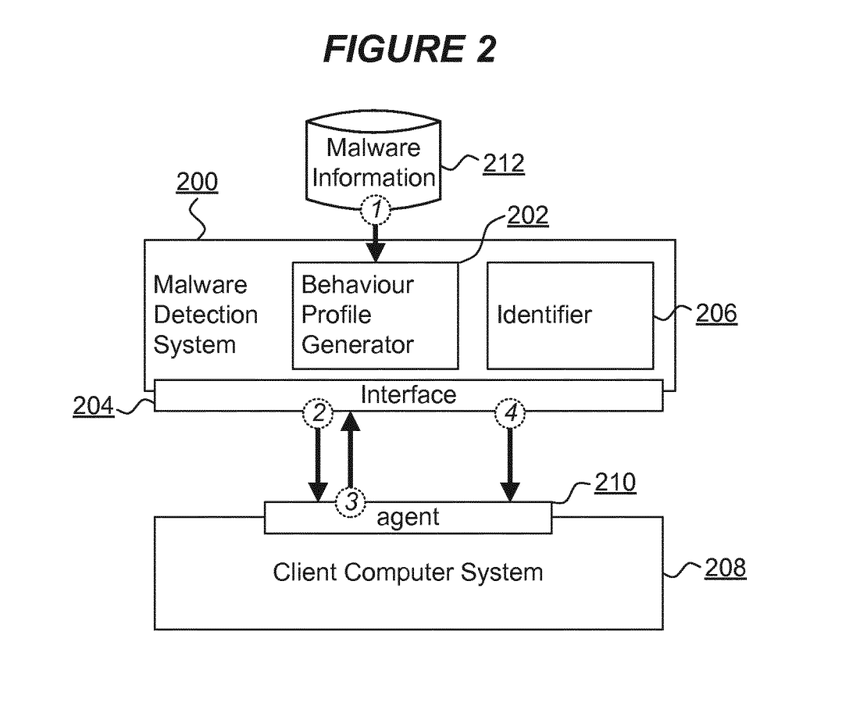
FIG. 2 is a schematic illustration of a malware detection system in accordance with embodiments of the present disclosure.

FIG. 2 is a schematic illustration of a malware detection system 200 in accordance with embodiments of the present disclosure. The malware detection system 200 is a software, hardware, firmware or combination component adapted to detect malware in a client computer system 208 on the basis of malware information store 212. The malware information store 212 includes entries for known malware including characteristics of malware. In particular, the malware information store 212 includes information indicating behavioral characteristics of malware that can be exhibited when a malware affects a computer system in execution. Such behavioral characteristics can include, inter alia: processes relating to malware; applications constituting malware; software components constituting malware; file modifications made by or for malware; data digests such as file digests or hashes for known malware or files including malware; an identification of facilities, services of features used or exploited by malware; and the like. The malware detection system 200 includes a behavior profile generator 202 and an identifier 206, both of which are software, hardware, firmware or combination components. The malware detection system 200 further includes an interface 204, such as a network or application interface via which the malware detection system 200 communicates with, and receives communication from, a client computer system 208 via a communications network such as a wired or wireless computer network. An example of such a network is the internet.

The behavior profile generator 202 is adapted to generate a behavior profile specifying operational behaviors of a computer system indicative of the existence of malware in the computer system. Operational behaviors include, inter alia, specific runtime functions that occur during the operation of a computer system and can vary depending on the facilities, services and resources of a computer system. For example, a smartphone can include telephony call making facilities and the making or receiving of a telephone call using such facilities is an example of an operational behavior of a smartphone. Other operational behaviors can include, inter alia: network operations such as the transmission or reception of data and associated characteristics of the network operations such as volume of data, nature of data, frequency of data, direction of data transfer (upstream (away from a computer system) or downstream (towards a computer system)) and also including indications of communications with particular remote services such as particular remote computer systems having particular network addresses, subnets, topologies, characteristics and the like; process execution including invoking, instantiating, spawning or otherwise triggering the execution of a software process, thread, function or routine in a computer system including the nature of such process (name, identifier, codebase, digest), the frequency of execution, associated processes, associated threads or subroutines, correspondences between processes and the like; data storage operations including the storage or retrieval of data from a data store in the computer system including volatile and non-volatile memories, the size and frequency of such operations; the undertaking of cellular telephony services such as telephone calls, messaging services such as short message services, multimedia messaging, video messaging or video calling, voice over IP (VOIP) calls and the like, including indications of classes of such operations such as local, regional, national or international calls or messages, and regular versus premium rate telephony services and also including indications of communications with particular remote services such as particular telephone numbers or network addresses; the hindrance of operational features or services such as the blocking of one or more computer system services including software services, hardware services and functions of the computer system; transitions in a state of the computer system such as a transition to, from or between a sleep, suspend, hibernate, low-power, off and on state and the like, or a locked, unlocked, silent, low-volume, high-volume state etc.; the use of particular software or hardware features of the device such as user interface features including input devices such as keyboards, keypads, touch screens, voice input, cameras, microphones and the like, output devices such as light sources, screens, speakers, ringers, buzzers and the like, positioning services such as global positioning services (GPS) and equivalents, accelerometers, vibrators and the like.

Thus for one or more particular items or classes of malware, a profile of behaviors indicative of the presence of such malware is generated by the behavior profile generator 202.

The behavior profile is defined as a lightweight mechanism for identifying behavior of a client computer system 208 that is indicative of the presence of malware. Thus, in use, the behavior profile can be used to identify client computer systems that are candidates for having malware operating in or with them. In one embodiment the behavior profile is a checklist, template or indicator list of behaviors that are readily checked by a client computer system, including computer systems being resource constrained. In one embodiment the behavior profile includes one or more thresholds defining an extent or degree to which certain behaviors are to be exhibited before a candidate of malware infection is identified, such as a threshold number of operational behaviors. For example, a smartphone behavior of making more than three premium rate telephone calls in a defined time period might be specified in the behavioral profile. Similarly, the execution of a particular process or thread at a particular frequency may be specified in the behavioral profile. Such profile entries can be considered behavior rules that, if satisfied, constitute behavior in conformance with the profile. Once generated, the behavior profile is communicated (2) by the malware detection system 200 to the client computer system 208 via the interface 204.

The client computer system 208 includes an agent 210 as a software, hardware, firmware or combination component adapted to receive the behavior profile from the malware detection system 200. In one embodiment the agent 210 is a lightweight agent that is capable of executing on the client 208 with low resource consumption. For example the agent 210 may: operate in a low-priority process mode of operation; exclude any user interface functionality including input and/or output functionality for interaction with a user of the client 208; reside at an operating system or application level of the client 208; and/or be specifically developed to have a relatively small footprint compares to that of other applications executing on the client 208. In use, the agent 210 is adapted to receive the behavior profile and monitor the client computer system 208 to identify operational behavior of the client 208 conforming to the behaviors specified in the behavior profile. In some embodiments this will involve checking rules specified in the behavior profile, such as counters of behaviors, frequencies of behaviors, volumes of data and the like. Such operations are necessarily lightweight operations that do not burden the client 208 and certainly burden the client 208 less than a full and regular anti-malware scan.

If the agent 210 determines that behaviors specified in the behavior profile are exhibited by the client 208, the agent 210 communicates (3) a message to the malware detection system 200 for receipt by the malware detection system 200 via the interface 204. The message triggers the identifier 206 which is adapted to identify a reaction instruction for communication to, and performance by, the client 208 on a determination that the client exhibits behaviors specified in the behavior profile. A reaction instruction is an instruction to the client 208 to perform a reactionary operation which can serve to, inter alia: limit the effect of any malware infection at the client and/or protect against future damage; and/or confirm the existence of a malware infection at the client. Accordingly, exemplary instructions include, inter alia: uninstalling, disabling, deleting, isolating or securing a particular file, application, data item, process or the like at the client 208 to prevent continued execution or infection or proliferation of infection by potential malware; disabling a service or facility of the client 208 such as a software, hardware, firmware or interface service of the client 208 to prevent or preclude exploitation of the client 208 or proliferation of the malware; and/or to undertake a detailed malware scan of all or part of the data, software, applications, memory or data stores of the client 208, such scan being performed either at the client itself (with resulting performance implications for the client) or in one embodiment at the malware detection system 200 by communicating such data, software, applications, memory or data to the malware detection system 200 conditionally on the basis of the findings of the agent 210 that the behaviors of the behavior profile is/are exhibited by the client 208. Accordingly, the reaction instruction is communicated (4) to the client 208 for execution by the client 208.

Notably, execution of the reaction instruction is not limited to the provision of software code as part of, in association with or constituting the reaction instruction. In some embodiments the reaction instruction is merely an indicator of a function, software routine or operation to be performed by the client 208 which the client is operable to perform on the basis of software, hardware or firmware existing at the client 208. For example, the reaction instruction can be an identifier of a reaction to be performed by the agent 210 at the client 208. Such reaction instruction can have associated parameters including identification of software, processes, applications, features, services, facilities, data items, data stores etc. that are to be affected by the reaction instruction. For example, a reaction instruction in response to frequent premium rate telephone calls can be to modify the telephony service of a client 208 to preclude premium rate calls for a defined period.

Thus, embodiments of the present disclosure provide considerable reduction in the communication between the client 208 and the malware detection system 200 and considerable reduction in processing demands for the malware detection system 200 while still preserving the centralization of the malware detection system 200 which can be shared by multiple (potentially many) clients. The use of a behavior profile to provide a lightweight mechanism for identifying candidate malware issues by the agent 210 at the client 208 prevents unnecessary communication between the client 208 and the malware detection system 200, and unnecessary processing by the malware detection system 200, except where the behavior profile indicates to the agent 210 that involvement of the malware detection system 200 is necessary. Accordingly considerable reductions of demand on a communications network and the malware detection system 200 are realized, and the benefits of centralized malware services continue to be available to resource constrained client computer systems.

In one embodiment, the malware information 212 is omitted and instead the behavior profile generator 202 is responsive to predefined malware behavior profile specifications from, for example, an operator of the malware detection system 200 or based on the output of a confirmed malware infection history of potentially many client computer systems. Such malware infection history can be used by a machine learning algorithm to define a learned profile for malware behavior to be checked by the agent 210 at the client computer system.

In one embodiment the malware detection system 200 is provided as, at or in conjunction with a server computer system on a communications network in communication with potentially multiple client computer systems. For example, the malware detection system 200 can be provided, inter alia: in a base station of a cellular telephone network; in a system of an internet service provider entity such as part of a customer access network, a central office, an exchange or a multiplexor; as a cloud service available remotely such as over the internet, and the like.

Figure 3:
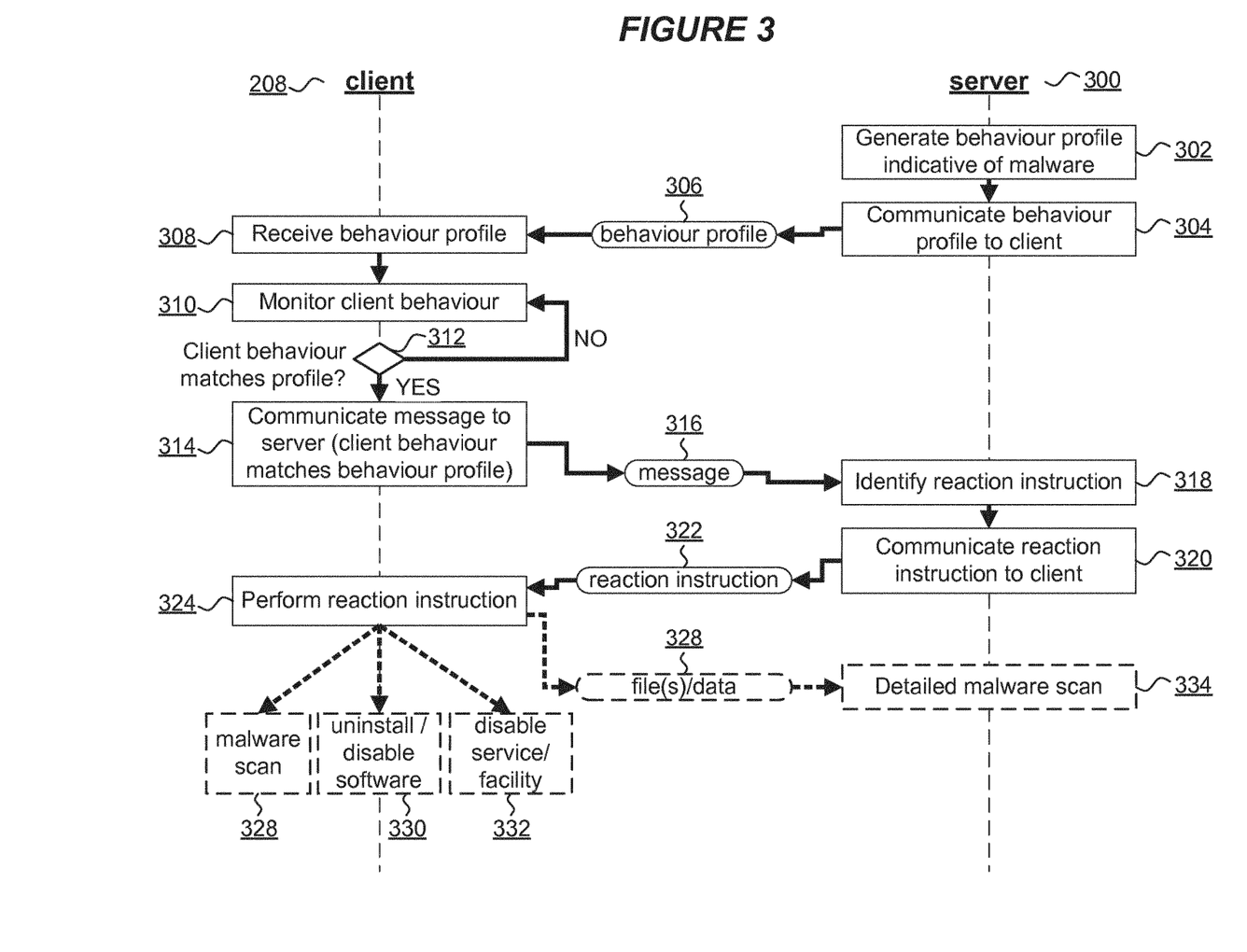
FIG. 3 is a flowchart of a method to detect malware in a client computer system in accordance with embodiments of the present disclosure.

FIG. 3 is a flowchart of a method to detect malware in a client computer system 208 in accordance with embodiments of the present disclosure. A malware detection system 200 substantially as herein described is provided at a server computer system 300. Initially, at 302, the server generates a behavior profile specifying behaviors that, if exhibited by the client 208, indicate the presence of malware. At 304 the server 300 communicates the behavior profile to the client 208. The client 208 receives 306 the behavior profile at 308 and undertakes to monitor the client behavior 310, such as by way of an agent 210 at the client 208. At 312 the client determines if the client behavior matches the behavior profile and, if so, communicates a message to the server 300 at 314. The server 300 receives 316 the message and identifies a reaction instruction at 318. At 320 the server 300 communicates the reaction instruction to the client 208. The client 208 receives 322 the reaction instruction and executes or performs the reaction instruction at 324. The steps of the method of FIG. 3 shown by broken lines are optional depending on the reaction instruction identified by the server 300 at 318. For example, the client 208 might undertake a malware scan at 328. The client 208 might uninstall or disable software at 330. The client 208 might disable a service or facility of the client 208 at 332. Or the client might communicate 328 files or data to the server for the server to perform a detailed malware scan at 334.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented malware detection method to detect malware in a client computer system connected to a network, the method comprising:
generating a behavior profile by a malware detection system specifying operational behaviors of a computer system indicative of the existence of malware in the computer system;
communicating the behavior profile to a client computer system remote from the malware detection system, via an interface of the malware detection system for communicating with the remote client computer system over the network; and
in response to a message from the remote client computer system received by the malware detection system via the interface indicating that the behavior profile is exhibited by the remote client computer system, identifying a reaction instruction for performance by the remote client computer system and communicating the reaction instruction to the remote client computer system from the malware detection system via the interface.

2. The method of claim 1 wherein the behavior profile specifies one or more actions performed by a computer system.

3. The method of claim 1 wherein the reaction instruction instructs the remote client computer system to cease execution of one or more software components at the remote client computer system.

4. The method of claim 1 wherein the reaction instruction instructs the remote client computer system to block one or more features or services of the remote client computer system.

5. The method of claim 1 wherein the reaction instruction instructs the remote client computer system to undertake a malware scan.

6. The method of claim 1 wherein the reaction instruction instructs the remote client computer system to transmit at least a portion of content stored in a memory of the remote client computer system, the method further comprising:
receiving the at least a portion of content by the malware detection system; and performing a malware scan on the received content by the malware detection system.

7. The method of claim 1 wherein the behavior profile is defined based on an analysis of one or more known malware software components such that the behavior profile is suitable for identifying behavior consistent with the known malware.

8. The method of claim 1 wherein the remote client computer system is a resource constrained computer system such that executing a malware scan on the remote client computer system can be expected to cause a reduction in performance of the remote client computer system that denies at least some of the services, facilities or functions of the remote client computer system to a user of the remote client computer system for at least a portion of the duration of the malware scan.

9. The method of claim 1 wherein the behavioral operations are taken from a list including: network operations; process execution; data storage operations; the undertaking of telephone calls; the undertaking of messaging communications; service blocking;
   use of a camera associated with the remote client computer system; and use of a microphone associated with the remote client computer system.

10. A malware detection system to detect malware in a client computer system connected to a network, the malware detection system comprising:
    a behavior profile generator adapted to generate a behavior profile specifying operational behaviors of a computer system indicative of the existence of malware in the computer system;
    an interface adapted to communicate the behavior profile to a client computer system remote from the malware detection system via the network; and
    an identifier responsive to a message received via the interface from the remote client computer system that the behavior profile is exhibited by the remote client computer system and adapted to identify a reaction instruction for performance by the remote client computer system,
    wherein the interface is further adapted to communicate the reaction instruction to the remote client computer system.

11. A malware detection system to detect malware in a client computer system connected to a network, the malware detection system comprising a processor, an interface, and a data store, wherein the processor is adapted to undertake the following:
    generating a behavior profile specifying operational behaviors of a computer system indicative of the existence of malware in the computer system;
    communicating the behavior profile to a client computer system remote from the malware detection system via the interface; and
    in response to a message received from the remote client computer system via the interface indicating that the behavior profile is exhibited by the remote client computer system, identifying a reaction instruction for performance by the remote client computer system and communicating the reaction instruction to the remote client computer system via the interface.

12. A non-transitory computer-readable storage medium storing a computer program element comprising computer program code to, when loaded into a computer system and executed thereon, cause the computer to perform a method to detect malware in a client computer system connected to a network by:
    generating a behavior profile via a malware detection system specifying operational behaviors of a computer system indicative of the existence of malware in the computer system;
    communicating the behavior profile to a client computer system remote from the malware detection system via an interface of the malware detection system for communicating with the remote client computer system; and
    in response to a message from the remote client computer system received via the interface indicating that the behavior profile is exhibited by the remote client computer system, identifying a reaction instruction for performance by the remote client computer system and communicating the reaction instruction to the remote client computer system via the interface.

13. The method of claim 1 wherein the malware detection system is provided at a server computer system.

14. The malware detection system of claim 11 further comprising a server computer system comprising the malware detection system.

* * * * *

UNITED STATES PATENT AND TRADEMARK OFFICE
CERTIFICATE OF CORRECTION

PATENT NO. : 11,586,733 B2
APPLICATION NO. : 15/541089
DATED : February 21, 2023
INVENTOR(S) : El-Moussa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this
Third Day of December, 2024

Katherine Kelly Vidal
*Director of the United States Patent and Trademark Office*